(12) United States Patent
Graber et al.

(10) Patent No.: US 8,419,037 B2
(45) Date of Patent: Apr. 16, 2013

(54) FIFTH WHEEL TRAVEL TRAILER

(75) Inventors: Randall L. Graber, Elkhart, IN (US); Thomas R. Cramer, Elkhart, IN (US)

(73) Assignee: Open Range RV Company, Shipshewana, IN (US)

( * ) Notice: Subject to any disclaimer, the term of this patent is extended or adjusted under 35 U.S.C. 154(b) by 30 days.

(21) Appl. No.: 13/088,960

(22) Filed: Apr. 18, 2011

(65) Prior Publication Data

US 2012/0261902 A1    Oct. 18, 2012

(51) Int. Cl.
*B62D 53/06* (2006.01)

(52) U.S. Cl.
USPC ................................ 280/433; 280/441.1

(58) Field of Classification Search .......... 280/433, 280/441.1, 441.2, 783, 789; 296/190.01, 296/24.31, 182.1, 186.1
See application file for complete search history.

(56) References Cited

U.S. PATENT DOCUMENTS

| | | | |
|---|---|---|---|
| 6,343,830 B1 * | 2/2002 | Ingram et al. | 296/168 |
| 6,447,038 B1 * | 9/2002 | Davis et al. | 296/26.05 |
| 7,111,897 B2 * | 9/2006 | Ingram et al. | 296/168 |
| 7,175,202 B2 * | 2/2007 | Budica | 280/781 |
| 7,191,567 B2 * | 3/2007 | Brandt et al. | 52/143 |
| 7,938,427 B2 * | 5/2011 | Ousley | 280/433 |
| 7,967,338 B1 * | 6/2011 | Anderson | 280/789 |
| 8,162,352 B2 * | 4/2012 | Rhymer et al. | 280/789 |
| 2007/0290495 A1 * | 12/2007 | Biscan | 280/789 |
| 2011/0227315 A1 * | 9/2011 | Rhymer et al. | 280/441.1 |

\* cited by examiner

*Primary Examiner* — Tashiana Adams
(74) *Attorney, Agent, or Firm* — Brinks Hofer Gilson & Lione

(57) ABSTRACT

A fifth wheel travel trailer chassis includes a front frame member, a first inner side frame member substantially perpendicular to the front frame member, a first outer side frame member substantially perpendicular to the front frame member, and a first brace member. The first inner side frame member has a forward end connected to a first end of the front frame member. The first outer side frame member has a forward end that is rearward of the front frame member. The first brace member has a first end connected to the first inner side frame member rearward of the front frame member and a second end connected to the forward end of the first outer side frame member.

17 Claims, 7 Drawing Sheets

FIFTH WHEEL TRAVEL TRAILER

BACKGROUND

1. Field of the Invention

The invention generally relates to a fifth wheel travel trailer, including a chassis for a fifth wheel travel trailer.

2. Description of Related Art

Recreational vehicles ("RVs") come in a variety of different shapes and sizes. One type of RV configuration is a travel trailer RV. The travel trailer RV generally ranges from 10 feet to 35 feet long and weighs between 2,000 and 9,000 lbs. Travel trailers generally have their own heating, air conditioning, electrical systems, and water tanks. Additionally, travel trailers often use slideouts to expand living space without adding unwanted length. Generally, these travel trailers can be towed by a properly equipped full sized car, SUV, or pickup truck having a load distributing hitch located near the rear of the vehicle.

Another type of RV configuration is a fifth wheel travel trailer. Fifth wheel trailers typically have an extension on the front which houses a bedroom and ends with a plate that is reminiscent of a wheel. The wheel attaches to a receiving hitch in the bed of a pickup truck that can, in turn, tow the fifth wheel trailer. This arrangement effectively provides living space and increases support and stability for towing. Generally, fifth wheel trailers range in length from 20 to 40 feet and weigh between 8,000 to 18,000 lbs. Because of their size and weight, many fifth wheel travel trailers must be towed by pickup trucks that have at least three-quarter ton capacity.

Fifth wheel trailers have traditionally shared common drawbacks. Because the fifth wheel travel trailer is coupled to a receiving hitch located in the bed of a towing pickup truck, the turning radius of the pickup truck when attached to the fifth wheel trailer can be limited, due to the location of the occupant compartment of the truck with respect to the travel trailer. As the distance between the occupant compartment of the truck and the travel trailer increases, so generally does the turning radius. If a pickup truck has a longer bed, such as commonly found on in three-quarter ton or full ton pickup trucks, the turning radius may be suitable for everyday driving. Advancements in fifth wheel travel trailer technology have yielded travel trailers that are capable of having a near 90 degree turning radius in three-quarter ton pickup trucks having beds of 6.5 feet or longer.

However, the turning radius of pickup trucks having a 5.5 foot bed equipped with a receiving hitch for towing a fifth wheel travel trailer, such as commonly found in half ton pickup trucks, is still limited. In some cases, the turning radius may be less than 70 degrees, severely limiting the maneuverability of the truck when towing a fifth wheel travel trailer. Since half ton pickup trucks are historically more prevalent than three quarter ton or full ton pickup trucks, it is desirable to provide a lighter fifth wheel trailer with an improved turning radius for more flexible use with half ton pickup trucks.

SUMMARY

A fifth wheel travel trailer includes a chassis and a housing having living space mounted to the chassis. The chassis includes a front frame member and first and second inner side frame members substantially perpendicular to the front frame member. The first and second inner side frame members each have a forward end that is connected to the front frame member. The chassis further includes first and second outer side frame members substantially perpendicular to the front frame member. Brace members connect the first and second outer side frame members to the first and second inner side frame members. Generally, the first and second brace members are configured to extend from the first and second inner side frame members at an angle to allow a vehicle towing the chassis to have a turning radius of approximately 90 degrees, even if the vehicle is a half-ton pickup truck with a short bed.

The chassis may also include spanning beam member substantially parallel to the front frame member. The first spanning beam member may be connected the forward ends of the first and second outer side frame member and the second end of the first and second brace members.

The housing may include a front face extending from the chassis. The front face generally has recessed portions, whereby the recessed portions allow a vehicle towing the travel trailer to have a turning radius of approximately 90 degrees. These recessed portions may be located near a bottom of the front face and may be further positioned on the outer portions of the front portion, Further objects, features and advantages of this invention will become readily apparent to persons skilled in the art after a review of the following description, with reference to the drawings and claims that are appended to and form a part of this specification.

DETAILED DESCRIPTION

Figure 1:
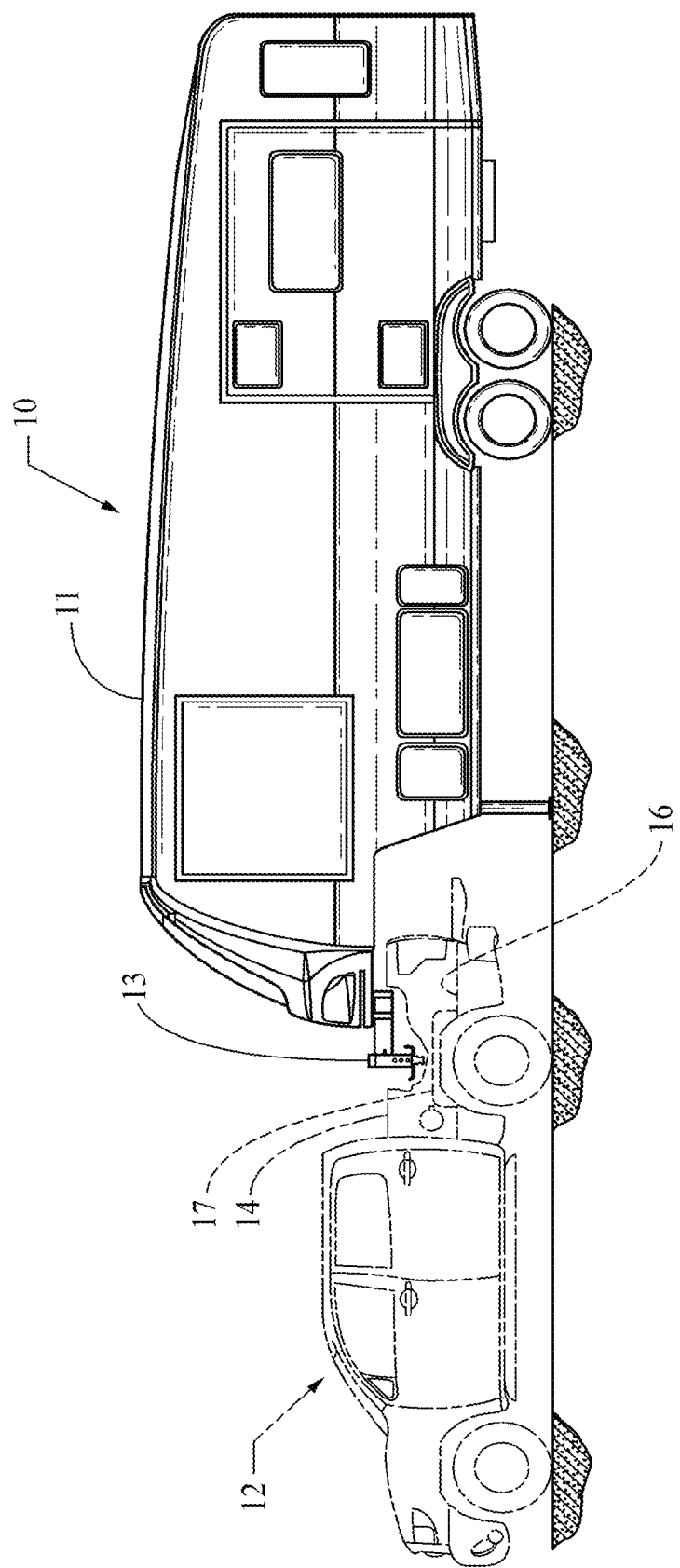
FIG. 1 illustrates a fifth wheel travel trailer being towed by a pickup truck.

Referring to FIG. 1, a fifth wheel travel trailer 10 connected to a truck 12 is shown. The truck 12 can be any type of vehicle utilizing a fifth wheel coupling system. In this embodiment, the truck 12 has a cargo box 14 with a bed 16. Located within the bed 16 of the truck 12 is a fifth wheel coupling system 17 for connecting the truck 12 to the fifth wheel travel trailer 10. The truck 12 may be a half ton pickup truck with a bed 16 having a length of approximately 5.5 feet. However, it should be understood that the truck 12 may be any type of vehicle capable of towing a fifth wheel travel trailer, such as three-quarter ton, full ton or larger pickup truck and may have any number of varying bed lengths.

Figure 2:
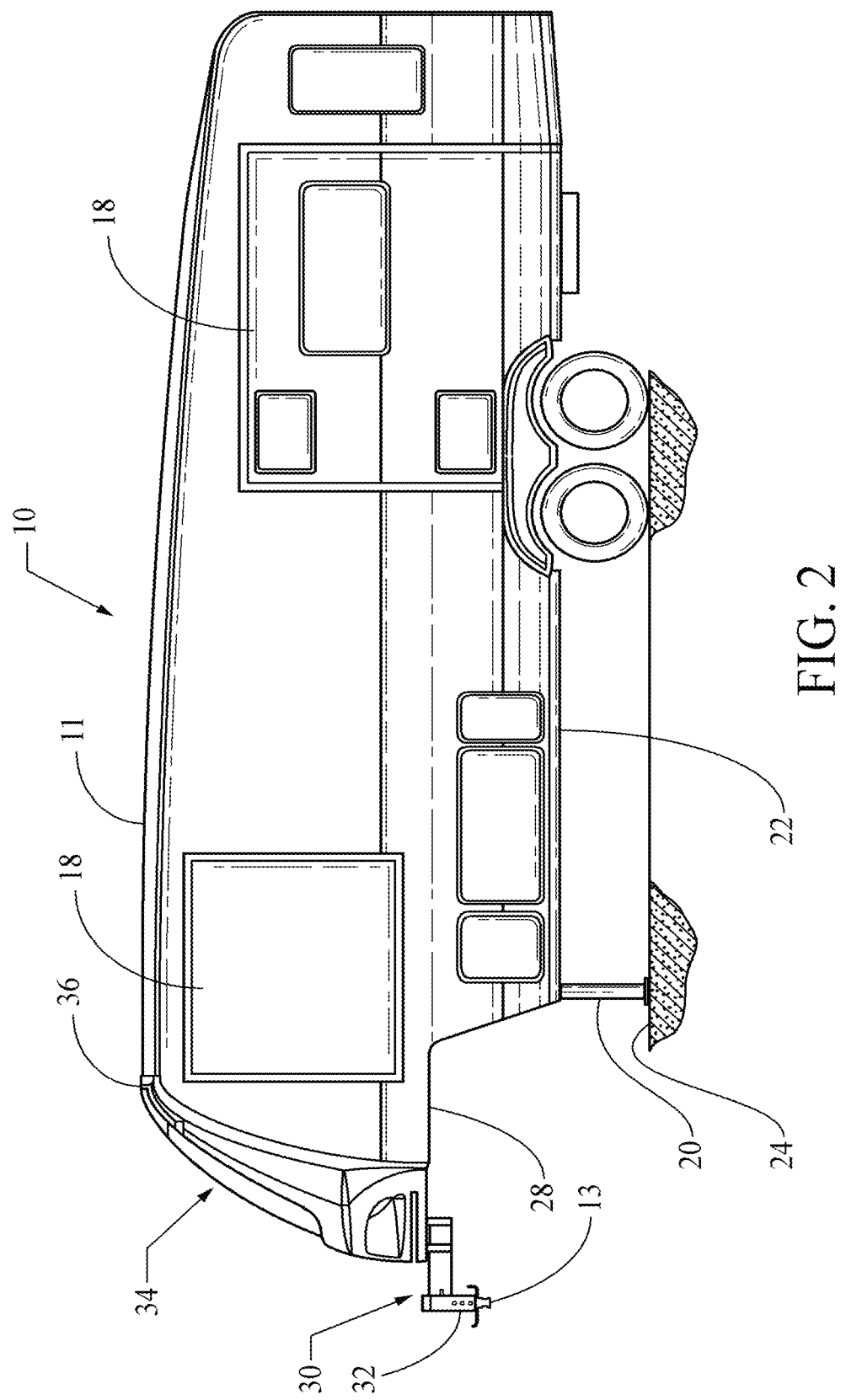
FIG. 2 illustrates the fifth wheel travel trailer of FIG. 1 without the pickup truck.
Figure 7:
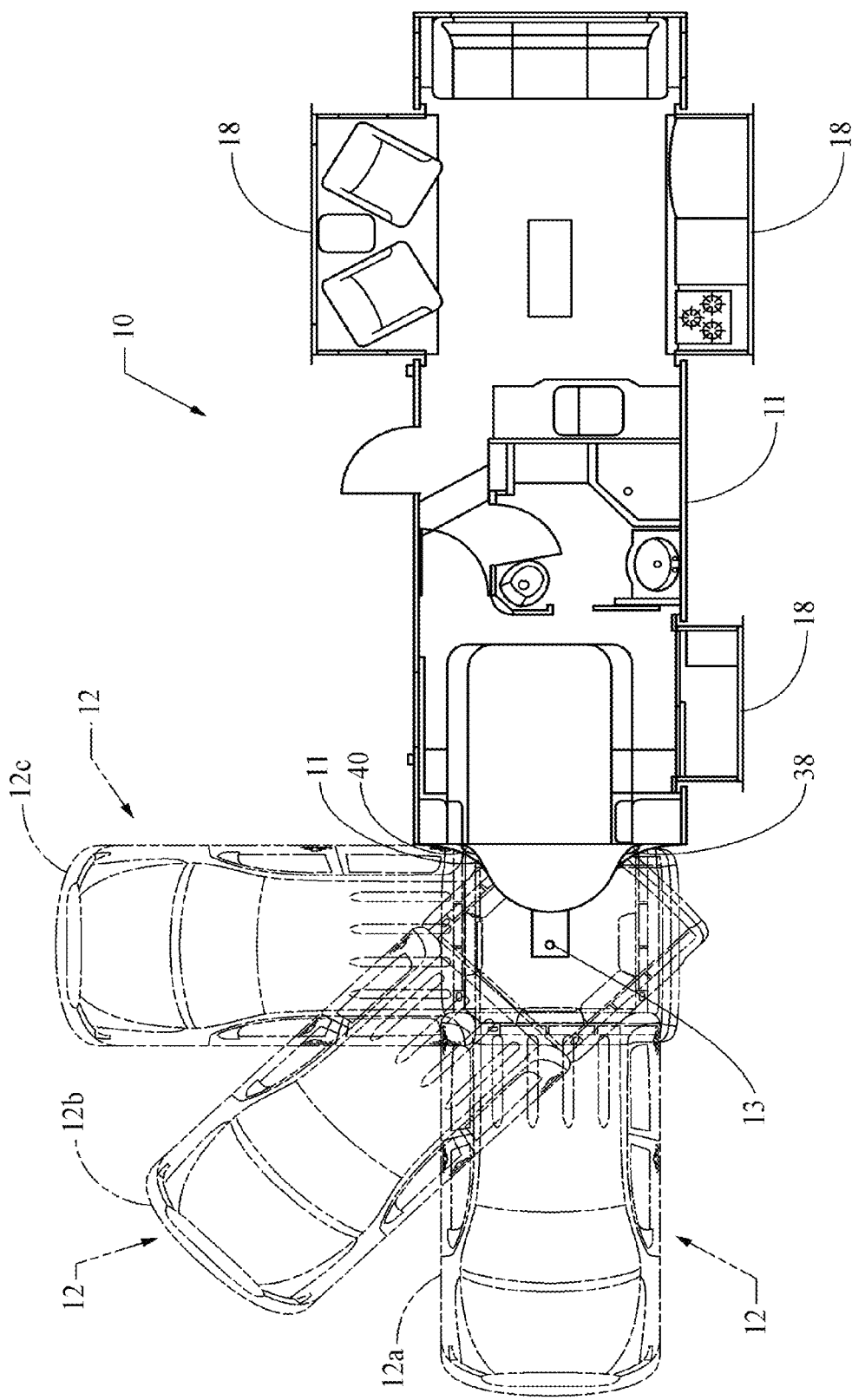
FIG. 7 illustrates the turning radius of the pickup truck towing the travel trailer of FIG. 1.

Referring to FIG. 2, the fifth wheel travel trailer 10 is shown disconnected from the truck 12 of FIG. 1. The travel trailer 10 has a housing 11 for living space, such as a kitchen, bedroom, dining room, or any other type of room suitable for living or storage. The travel trailer 10 may include one or more slideouts 18 which allow for additional living space. As best shown in FIG. 7, the slideouts 18 can be extended when the travel trailer 10 is parked to expand living space. Referring back to FIG. 2, the fifth wheel travel trailer 10 may include one or more support legs 20 that are utilized when the travel trailer 10 is not connected to the truck 12. The support legs 20 extend generally from a lower deck 22 of the travel trailer 10 towards a support surface 24.

Attached to an upper deck 28 of the travel trailer 10 is a hitch assembly 30. As will be described later in this specification, the hitch assembly 30 is connected to a chassis of the travel trailer 10. The hitch assembly 30 has an adjustable hitch 32 that can be adjusted to mate with the fifth wheel coupling device 17 of FIG. 1. By so doing, this allows the truck 12 to tow the travel trailer 10, as best shown in FIG. 1.

Figure 3:
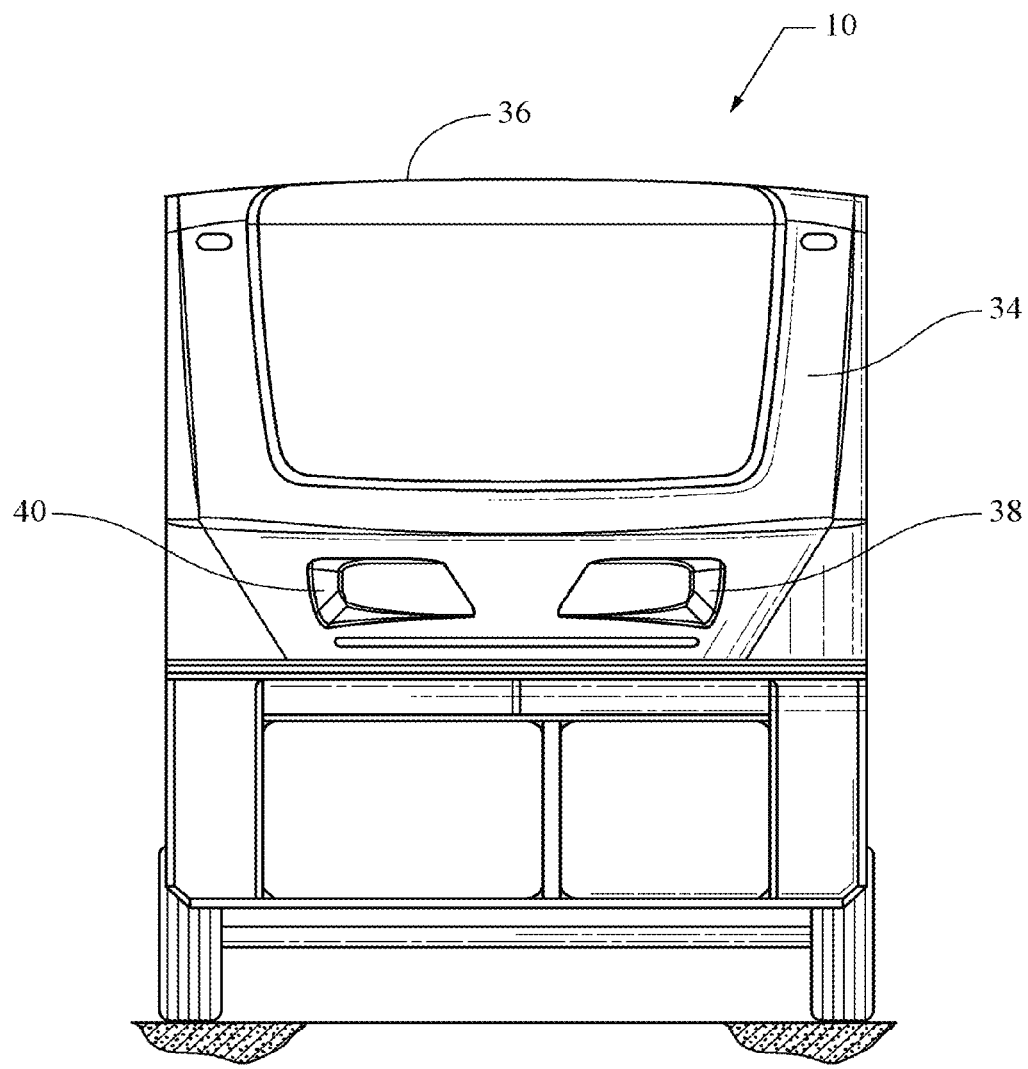
FIG. 3 illustrates a front view of the travel trailer of FIG. 2.

Referring to FIGS. 2 and 3, as stated before, the fifth wheel travel trailer 10 includes the housing 11 for living space. The housing 11 includes a front face 34. The front face 34 generally extends from a top 36 of the housing 11 of the travel trailer 10 towards the bottom of the upper deck 28. The front face 34 generally curves as it extends from the top 36 of the travel trailer 10 to assist with aerodynamics of the fifth wheel travel trailer 10 and provide additional storage space inside the fifth wheel travel trailer 10. The front face 34 also includes recessed portions 38 and 40 located near the bottom of the front face 34, near the upper deck 28. The recessed portions 38 and 40 serve to increase the turning radius of the truck 12 with respect to the travel trailer 10, which increased turning radius is present even with a half-ton pickup truck having a shorter bed.

Figure 4:
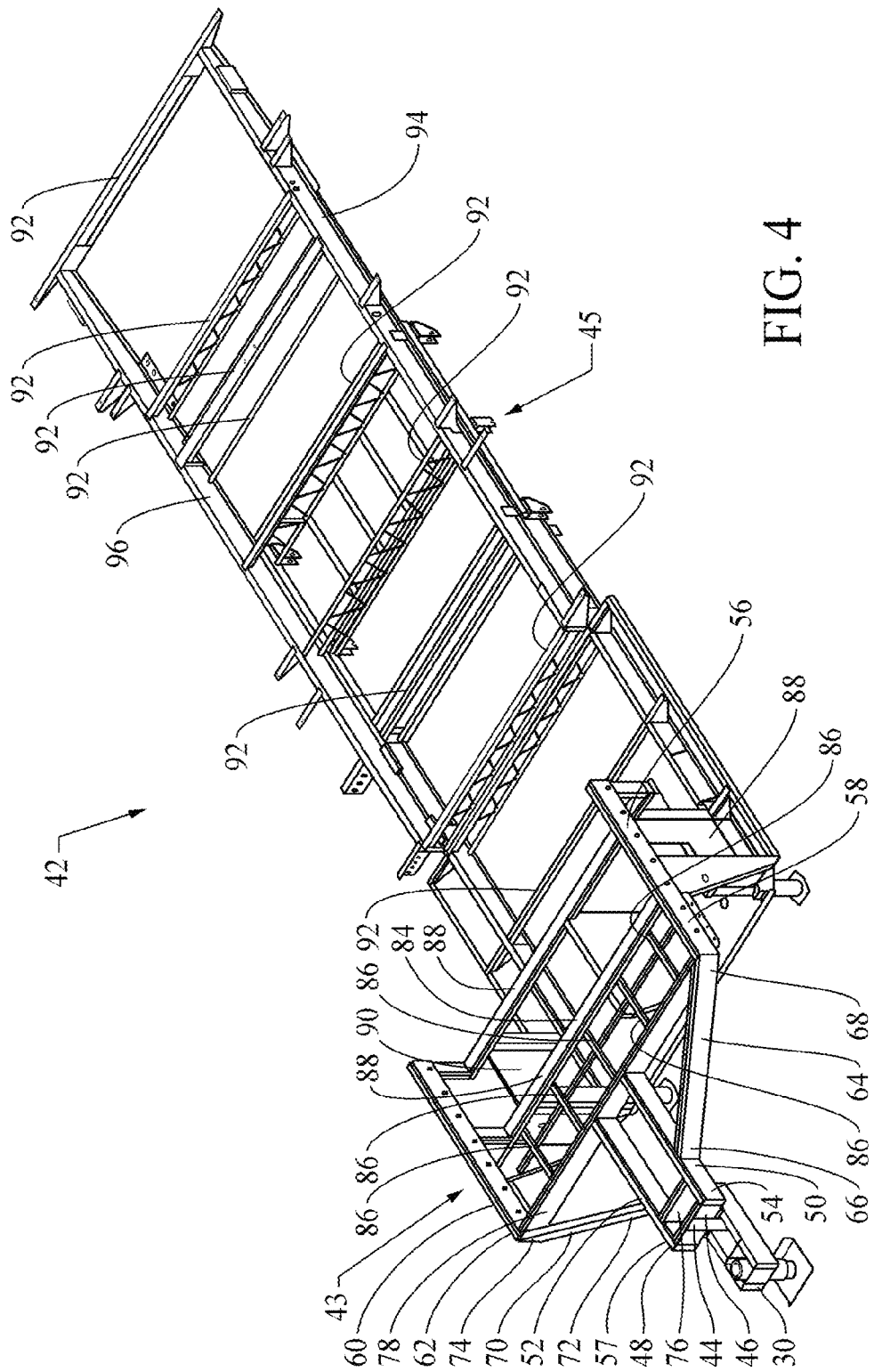
FIG. 4 illustrates an isometric view of a chassis of the fifth wheel travel trailer of FIG. 2.
Figure 5:
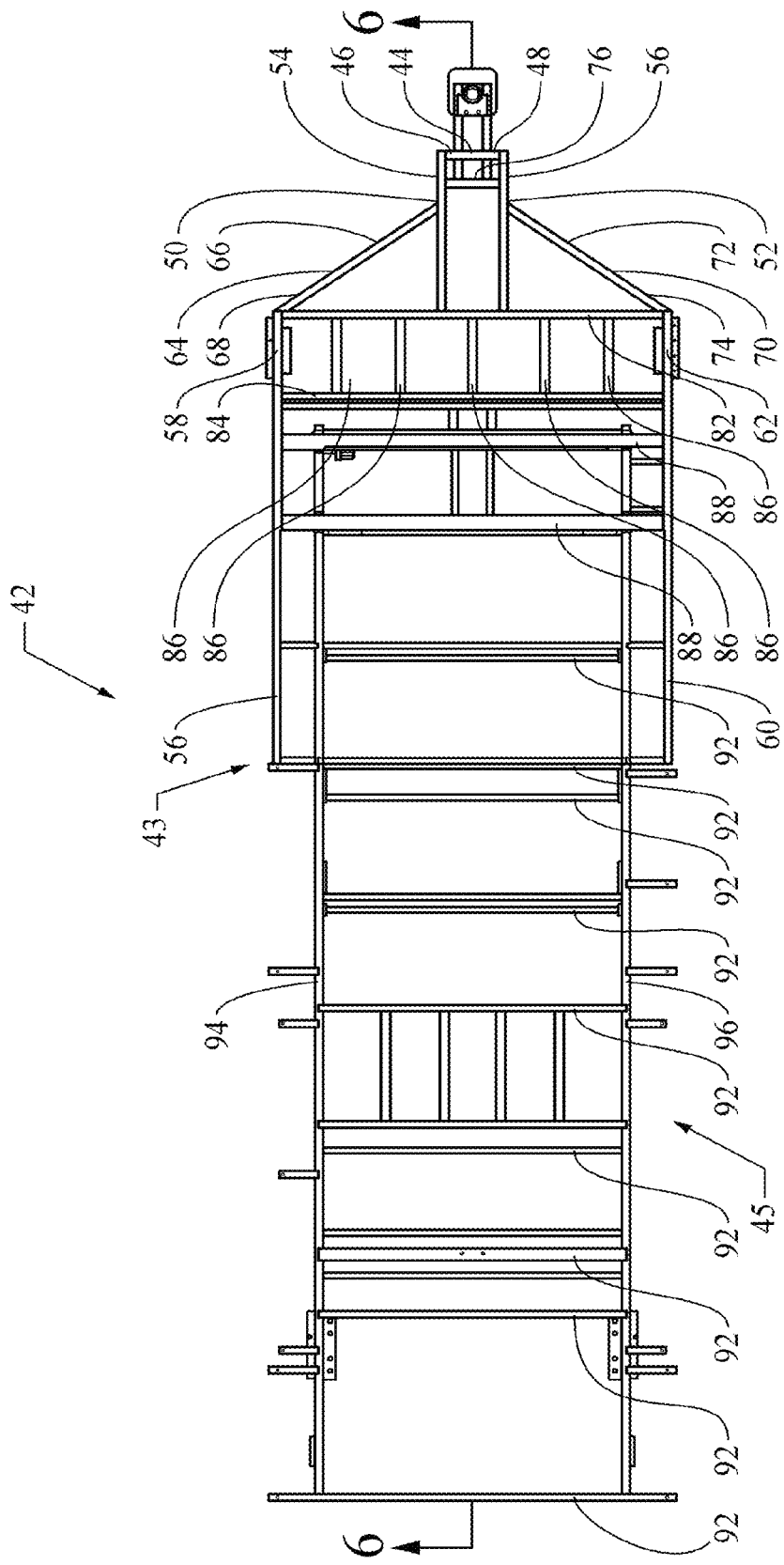
FIG. 5 is a top view of the chassis of FIG. 4.
Figure 6:
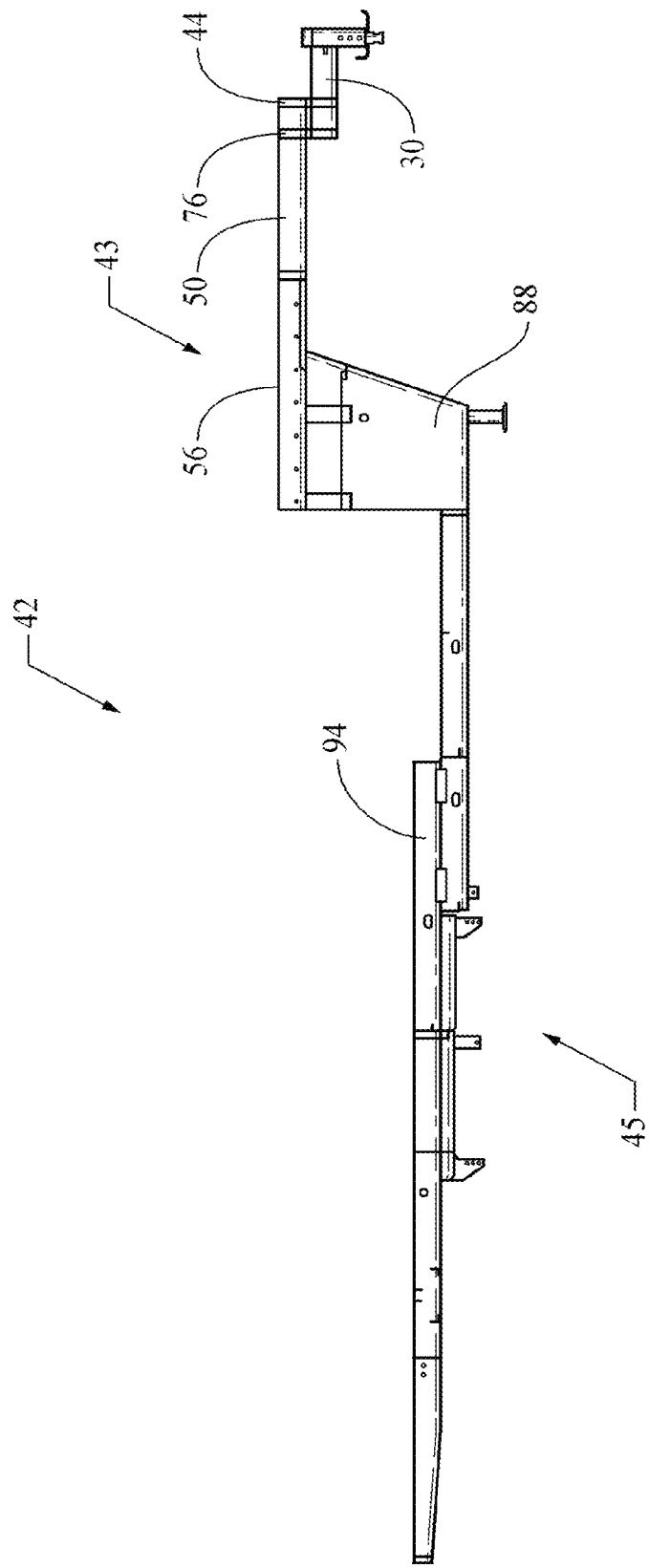
FIG. 6 is a side view of the chassis of FIG. 4, generally taken along lines 6-6 of FIG. 5.

Referring to FIGS. 4, 5, and 6, the travel trailer 10 includes a chassis 42 to which the housing 11 is mounted. FIG. 4 illustrates an isometric view of the chassis 42, while FIGS. 5 and 6 illustrate top and side views of the chassis system 42, respectively. The chassis 42 generally has an upper deck portion 43 and a lower deck portion 45.

The upper deck portion 43 includes a front frame member 44 having a first end 46 and a second end 48. The upper deck portion 43 also includes first and second inner side frame members 50 and 52 that are preferably substantially perpendicular to the front frame member 44. The first inner side frame member 50 has a forward end 54 that is connected to the first end 46 of the front frame member 44. In like manner, the second inner side frame member 52 also has a forward end 57 that is connected to the second end 48 of the front frame member 44. Of course, first and second inner side frame members 50 and 52 may also extend at other, non-perpendicular angles to the front frame member 44.

The upper deck portion 43 of the chassis 42 also includes a first outer side frame member 56 and a second outer side frame member 60. The first outer side frame member has a forward end 58 that is generally rearward of the front frame member 44. In like manner, second outer side frame member 60 also has a forward end 62 that is generally rearward of the front frame member 44.

A first brace member 64 has a first end 66 connected to the first inner side frame member 50 at a point that is rearward of the front frame member 44. The first brace member 64 also has a second end 68 connected to the forward end 58 of the first outer side frame member 56. The chassis 42 also includes a second brace member 70 having a first end 72 and a second end 74. Similar to the first brace member 64, the first end 72 of the second brace member 70 is connected to the second inner side frame member 52 at a point rearward of the front frame member 44. The second end 74 of the second brace member 70 is connected to the forward end 62 of the second outerside frame member 60. Generally, the first and second brace members 64 and 70 are configured to extend rearwardly from the first and second inner side frame members 50 and 52, respectively, at an angle to allow a vehicle towing the chassis 42 to have a turning radius of approximately 90 degrees. Attachment of the first and second brace members 64 and 70 to the first and second inner side frame members 56 and 60 at a point rearward of the front frame member 44 pushes the hitch assembly 30 forward relative to the brace 64 and 70 and the housing 11, thus helping to create improved clearance between the point of coupling 13 to the truck 12 and the front face 34 of the housing 11.

Although not shown, the brace members 64 and 70 may extend rearwardly from the inner side frame members 56 and 60 at different angles, depending on the construction of the chassis, including factors such as the width of the upper deck, the spacing of the inner side frame members, the length of the side frame member and other variables as would be known by those of skill in the art. Additionally, the brace members can extend rearwardly from the inner side frame members in any number of alternative paths, taking non-arcuate or arcuate forms. For instance, brace members can both include convex or concave portions as desired.

The chassis 42 also includes a cross beam member 76 substantially parallel to the front frame member 42. The cross beam member 76 is connected to the first and second inner side frame members 50 and 52. The cross beam member 76 is generally located forward of the first and second brace members 64 and 70. The cross beam member, however, may also be located rearward of the front frame member. Alternatively, the chassis may include additional cross beam members extending between the inner side frame members as needed.

The hitch assembly 30 is shown connected to the front frame member 42 and to the cross beam member 76. It is likewise contemplated that the hitch assembly may be connected to only the front frame member, or to the front frame member and one or both of the inner side frame members. As stated previously, the hitch assembly is configured to connect the chassis 42 to a fifth wheel coupling mounted to a vehicle to allow the towing of the chassis 42 by a vehicle.

Substantially parallel to the front frame member 42 is a first spanning beam member 78. The first spanning beam member 78 is connected to the forward ends 58 and 62 of the first and second outer side frame members 56 and 60, respectively. Additionally or alternatively, the first spanning beam member 78 may be connected to the second ends 68 and 74 of the brace members 64 and 70, respectively. The first spanning beam member 78 is also connected to rearward ends 80 and 82 of the first and second inner side frame members 50 and 52. Generally, the first spanning beam member 78 spans most of the width of the chassis 42 and travel trailer 10. Thus, the length of the front frame member 42 is preferably less than half of the length of the first spanning beam member 78, although the front frame member may likewise be longer depending on configuration of the travel trailer.

The chassis 42 may also include a second spanning beam member 84 that is substantially parallel to the front frame member 42 and is generally rearward of the first spanning beam member 78. The second spanning beam member 84 is connected to the first and second outer side frame members 56 and 60. A plurality of connection beams 86 extend between and connect the first and second spanning beam members 78 and 84. Generally, the plurality of connection beams 86 are substantially perpendicular to the first and second spanning beam members 74 and 84. One or more similar connection beams may also extend between the first spanning beam member and the brace members if additional reinforcement is required. Further, the upper deck 43 of the chassis 42 may also include additional support beams 88 extending between the first and second outer side frame members 56 and 60 to provide additional support to the upper deck portion 43 of the chassis 42.

The lower deck portion 45 of the chassis 42 includes a first lower deck side beam 94 and a second lower deck side beam 96. The first and second lower deck side beams 94 and 96 are connected to members 88 and 90 which in turn connect the lower deck portion 45 to the upper deck portion 43. Additionally, the lower deck portion 45 of the chassis 42 may also include a plurality of support beams 92 spanning between the first and second lower deck side beams.

Referring to FIG. 7, by constructing a travel trailer 10 utilizing the chassis 42 and the forward portion 34 having recessed portions 38 and 40, the truck 12 can have a turning radius of approximately 90 degrees with respect to the travel trailer 10, even if the truck 12 has a relatively short bed, such as those found in half-ton pickup trucks.

As shown in FIG. 7, the truck 12 is shown in three positions with respect to the travel trailer 10. In the first position, the truck 12a is in line with the travel trailer 10. In the second position, the truck 12 is at an approximate 45 degree angle with respect to the travel trailer 10. In the third position, [explain]. By utilizing the chassis system 42 and forward portion 34 the recessed portions 38 and 40, the truck 12 with a short bed is capable of having a 90 degree turning radius even when towing the fifth wheel trailer 10.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A fifth wheel travel trailer comprising:
 a chassis including:
  a front frame member having a first end and a second end;
  a first inner side frame member substantially perpendicular to the front frame member, the first inner side frame member having a forward end connected to the first end of the front frame member;
  a first outer side frame member substantially perpendicular to the front frame member, the first outer side frame member having a forward end that is rearward of the front frame member;
  a first brace member having a first end connected to the first inner side frame member rearward of the front frame member and a second end connected to the forward end of the first outer side frame member, wherein the first brace member extends rearward from the first inner side frame member to the forward end of the first outer side frame member;
  wherein the chassis further comprises a first spanning beam member substantially parallel to the front frame member, the first spanning beam member being connected to at least one of the forward end of the first outer side frame member and the second end of the first brace member;
  wherein the chassis further comprises a second spanning beam member substantially parallel to the front frame member and rearward of the first spanning beam member, the second spanning beam member being connected to the first outer side frame member, wherein the front frame member, first spanning beam member, and second spanning beam member substantially define a plane; and
 a housing having living space mounted to the chassis.

2. The fifth wheel travel trailer of claim 1, further comprising a hitch assembly connected to the chassis and forward of the first brace member, the hitch assembly being configured to connect the chassis system to a fifth wheel coupling mounted to a vehicle.

3. The fifth wheel travel trailer of claim 1, wherein the hitch assembly is connected to the front frame member.

4. The fifth wheel travel trailer of claim 1, wherein the chassis further comprises a cross beam member substantially parallel to the front frame member, the cross beam member being connected to the first inner side frame member.

5. The fifth wheel travel trailer of claim 4, wherein the cross beam member is forward of the first brace member.

6. The fifth wheel travel trailer of claim 5, wherein the hitch assembly is connected to the cross beam member.

7. The fifth wheel travel trailer of claim 1, wherein the first spanning beam member is connected to a rearward end of the first inner side frame member.

8. The fifth wheel travel trailer of claim 1, wherein the length of front frame member is less than half of the length of the first spanning beam member.

9. The fifth wheel travel trailer of claim 1, wherein the chassis further comprises a plurality of connection beams being substantially perpendicular to and extending between the first and second spanning beam members.

10. The fifth wheel travel trailer of claim 1, wherein the chassis further comprises:
 a second inner side frame member substantially perpendicular to the front frame member, the second inner side frame member having a forward end connected to the second end of the front frame member;
 a second outer side frame member substantially perpendicular to the front frame member, the second outer side frame member having a forward end that is rearward of the front frame member; and
 a second brace member having a first end connected to the second inner side frame member rearward of the front frame member and a second end connected to the forward end of the second outer side frame member.

11. The fifth wheel travel trailer of claim 10, wherein the second brace member extends rearward from the second inner side frame member to the forward end of the second outer side frame member.

12. The fifth wheel travel trailer of claim 11, wherein the chassis further comprises a cross beam member substantially parallel to the front frame member, the cross beam member being connected to the second inner side frame member.

13. The fifth wheel travel trailer of claim 12, wherein the cross beam member is forward of the second brace member.

14. The fifth wheel travel trailer of claim 1, wherein the first brace member is configured to extend from the first inner side frame member at an angle to allow a vehicle towing the chassis to have a turning radius of approximately 90 degrees.

15. The fifth wheel travel trailer of claim 1, wherein the housing further comprises a front face extending from the chassis, the front face having at least two recessed portions, whereby the at least two recessed portions allow a vehicle towing the chassis to have a turning radius of approximately 90 degrees.

16. The fifth wheel travel trailer of claim 15, wherein the recessed portions are located near a bottom of the front face.

17. The fifth wheel travel trailer of claim 15, wherein the recessed portions are located proximate the outer portions of the front face.

* * * * *